United States Patent
Bernhart et al.

(10) Patent No.: US 6,493,558 B1
(45) Date of Patent: Dec. 10, 2002

(54) TD-SMS MESSAGING GATEWAY

(75) Inventors: George Bernhart, Trophy Club, TX (US); Douglas Deeds, Fort Worth, TX (US); Paul Kearney, Oulu (FI); Jari E. O. Kiuru, Kangasale (FI); Kari-Pekka Wilska, Fort Worth, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/436,320

(22) Filed: Nov. 8, 1999

Related U.S. Application Data

(60) Provisional application No. 60/159,523, filed on Oct. 15, 1999.

(51) Int. Cl.⁷ .................................................. H04Q 7/20
(52) U.S. Cl. ...................... 455/466; 455/456; 455/418; 455/414; 379/52; 379/90.01; 379/93.05
(58) Field of Search .................................. 455/553, 466, 455/412, 556, 557, 418, 419, 461, 560, 561, 445, 414; 379/52, 90.1, 93.5, 96, 99, 97; 709/230, 250

(56) References Cited

U.S. PATENT DOCUMENTS

| | | | | |
|---|---|---|---|---|
| 5,248,181 A | * | 9/1993 | Efthimiou | 297/130 |
| 5,742,668 A | * | 4/1998 | Pepe | |
| 5,742,905 A | * | 4/1998 | Pepe et al. | 379/211.01 |
| 5,852,777 A | * | 12/1998 | Harrison | 455/414 |
| 5,905,476 A | * | 5/1999 | McLaughlin | |
| 5,933,778 A | * | 8/1999 | Buhrmann et al. | 379/211.02 |
| 5,974,116 A | * | 10/1999 | Engelke | |
| 5,995,849 A | * | 11/1999 | Williams et al. | 455/554 |
| 6,002,749 A | * | 12/1999 | Hansen | |
| 6,021,178 A1 | * | 2/2001 | Locke | |
| 6,233,314 B1 | * | 5/2001 | Engelke | |
| 6,246,688 B1 | * | 6/2001 | Angwin et al. | 370/392 |
| 6,307,921 B1 | * | 10/2001 | Engelke | |
| 6,308,062 B1 | * | 10/2001 | Chien | |
| 2002/0001368 A1 | * | 1/2002 | Simth | |
| 2002/0058495 A1 | * | 5/2002 | Chow et al. | 455/406 |

* cited by examiner

Primary Examiner—Edward F. Urban
Assistant Examiner—Khawar Iqbal
(74) Attorney, Agent, or Firm—Brian T. Rivers

(57) ABSTRACT

A gateway interface between the public switched telephone system (PSTN) and cellular network. The gateway interface provides a conversion function between the SMS text messaging protocol and TD device text messaging protocol. The conversion function includes appropriate queuing and timing features that allow the SMS and TD functions to communicate. In an embodiment of the invention, the method and apparatus is implemented as a stand-alone gateway. The gateway may be implemented anywhere there is access to the public switched telephone network (PSTN) and coverage by a cellular system having short messaging service (SMS) capability.

19 Claims, 3 Drawing Sheets

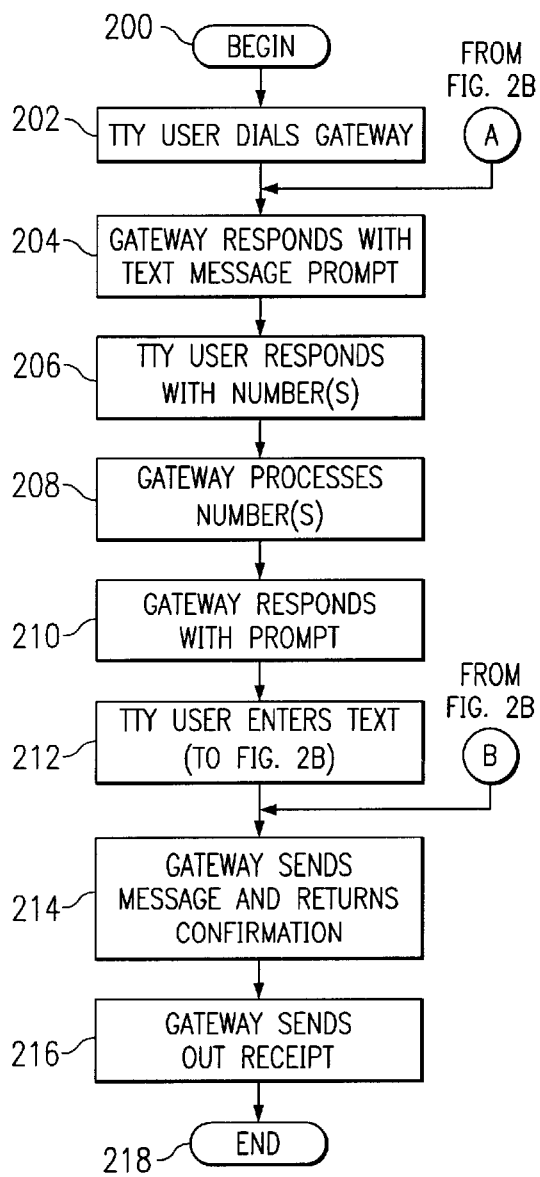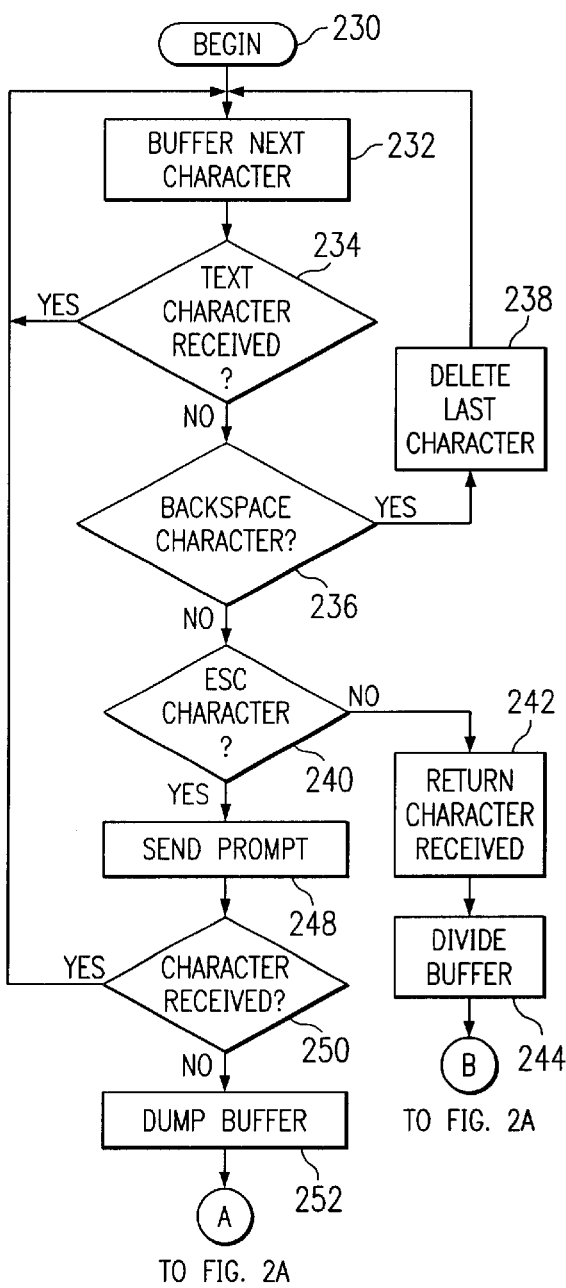

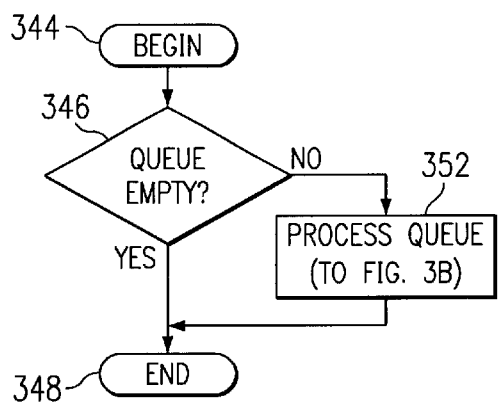
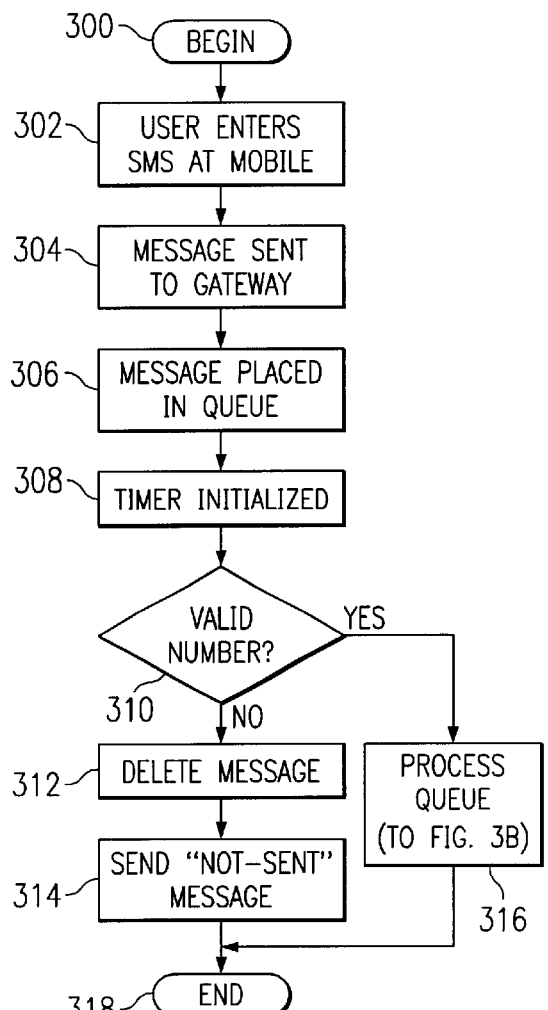
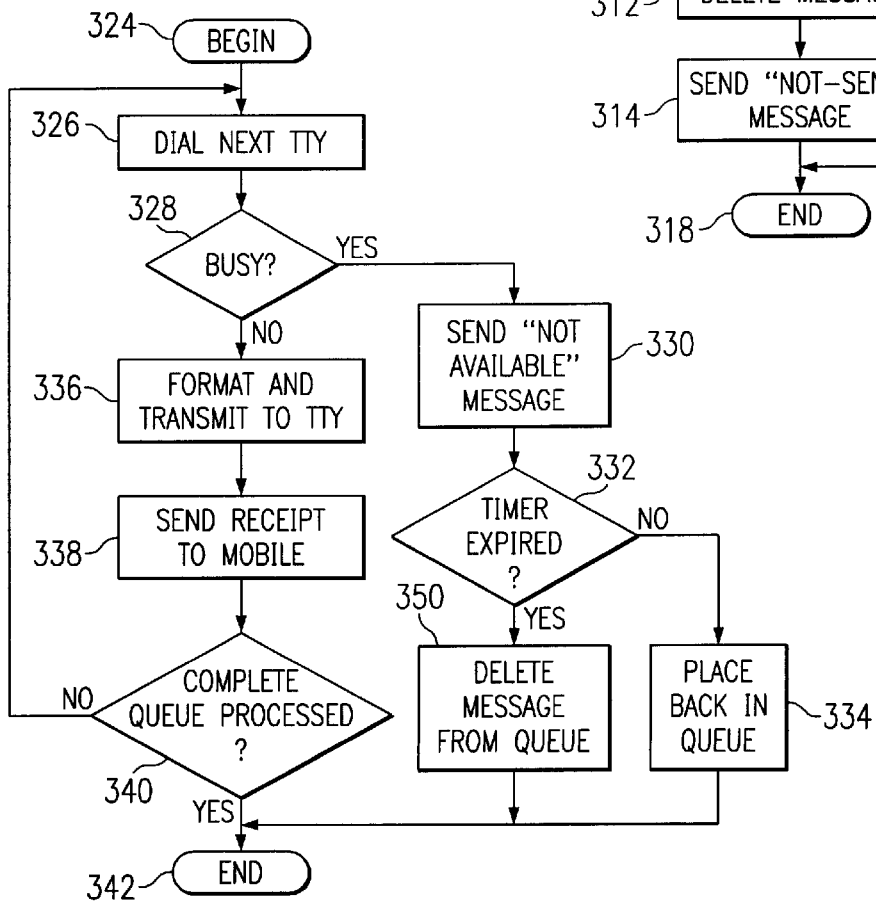

TD-SMS MESSAGING GATEWAY

CLAIM OF PRIORITY FROM A COPENDING PROVISIONAL PATENT APPLICATION

Priority is herewith claimed under 35 U.S.C. §119(e) from Provisional Patent Application 60/159,523, filed Oct. 15, 1999, entitled "TD-SMS Messaging Gateway," by George Bernhart, Douglas Deeds, Paul Kearney, Jari Kiuru, and Kari-Pekka Wilska. The disclosure of this Provisional Patent Application is incorporated by reference herein in its entirety.

FIELD OF THE INVENTION

The invention relates to text messaging in a telecommunication system and, more particularly, to a method and apparatus for providing text messaging between mobile handsets and TD devices in a telecommunication system.

BACKGROUND OF THE INVENTION

Telecommunication devices for the deaf (TDD) have been developed that allow deaf persons to communicate by text messaging through the public switched telephone network (PSTN). The most common type of TDD is a telecommunication device (TD) at which a user may type in text messages for transmission and read received messages on a screen printout. A TD is fixed in location and is intended for communication with other TDDs over a landline network in an interactive manner. TDs commonly communicate according to the Electronic Industry Association's (EIA) "Telecommunications Devices for the Deaf" PN-1663 Standard (PN-1663).

A TDD, operating according to the PN-1663 Standard, communicates through the PSTN by transmitting and receiving strings of 1s and 0s that are encoded as either Baudot or ASCII codes. For Baudot coding, a 1 is transmitted through the PSTN as a 1400 Hz signal and a 0 is transmitted as an 1800 Hz signal. For ASCII coding, an originating TDD transmits a 1 through the PSTN as a 1270 Hz signal and a 0 as a 1070 Hz signal, and an answering TDD transmits a 1 as a 2225 Hz signal and a 0 as a 2025 Hz signal.

Recent advances in communication technology have resulted in cellular systems and technology that free users from the typical restraints of conventional landline telephone use. These advances include small, lightweight, portable, wireless phones that may be carried and used to communicate anywhere cellular service is provided. Present wireless phones have the capacity to send and receive short-text messages through a short messaging service (SMS). The SMS is standardized according to the standard in which the system operates. Unlike TDD systems using TD devices, SMS systems do not operate interactively over a circuit connection between communicating devices. SMS systems operate according to a store-and-deliver service, and SMS text messages have a fixed character length.

SUMMARY OF THE INVENTION

The present invention provides a method and apparatus for providing text messaging between mobile handsets and telecommunication devices in a telecommunication system. The method and apparatus allows short messaging service (SMS) capable mobile handsets to communicate with a telecommunication device (TD). The method and apparatus may be implemented into a mobile network/public switched telephone network (PSTN) as a stand-alone gateway interface without the need to reconfigure or modify the network hardware. A user of an SMS-capable mobile handset may send text messages to a user of a TD device or receive text messages sent by the user of a TD device. The method provides an interface function that allows a deaf person having access to a TD device to communicate with mobile handset users. It also allows a mobile handset user to send communications to a deaf person using a TD device.

The method and apparatus utilizes a gateway interface between the public switched telephone system (PSTN) and cellular network. The gateway interface provides a conversion function between the SMS text messaging protocol and TD device text messaging protocol. The conversion function includes appropriate queuing and timing features that allow the SMS and TD functions to communicate.

In an embodiment of the invention, the method and apparatus is implemented as a stand-alone gateway. The gateway may be implemented anywhere there is access to the public switched telephone network (PSTN) and coverage by a cellular system having short messaging service (SMS) capability. The gateway includes a controller and a transceiver. The controller may be implemented in a personal or similar type of computer. The transceiver operates according to the standard of a cellular system, including the system's SMS features covering the area in which the transmitter is located. The transceiver is assigned a mobile network phone number and is capable of making and receiving calls under the control of the controller. The transceiver may be a conventional cellular handset connected to the controller through, for example, a bus such as an RS-232, or the transceiver may be a specially constructed transceiver built into the controller. The controller may be connected to the PSTN through a TD modem. The controller is assigned a PSTN phone number and communicates with TD devices that are connected to the PSTN using a TDD protocol. Connections may be provided through the Internet to allow multiple gateways to communicate with one another. The Internet connections allow multiple gateways to bypass the PSTN when communicating.

In order to initiate TD to mobile station communications, the user of a TD device dials the PSTN phone number that is assigned to the gateway. When a connection is made, the gateway then sends the appropriate responses in TDD protocol to prompt the user of the TD to enter the phone number of the mobile station(s) that are to receive a message. As the message is entered at the TD, the gateway buffers and converts the message to an appropriate format for SMS, according to the embodiment. By entering the message and following the prompts, the user is able to have the message sent to a destination mobile through the gateway.

In order to initiate mobile station to TD communications, the user of a mobile station sends a message via SMS to the mobile network phone number of the gateway transceiver. The message includes a phone number for each TD device that is to receive the message. Messages received by the gateway that are intended for a TD are placed in a queue within the gateway. The gateway processes the messages in the queue by dialing the phone number(s) of the message that has been in the queue the longest time. For each TD phone number that is busy, the gateway will retry dialing for a predetermined period of time. If the TD phone number is busy, the gateway will send an SMS message informing the mobile station that the TD is busy, but that the gateway will retry for the predetermined period of time. If the TD answers, the gateway performs appropriate functions so that the message sent to the TD meets TTD protocol requirements.

BRIEF DESCRIPTION OF THE DRAWINGS

FIGS. 2A and 2B are flow diagrams showing steps performed while processing a TD to mobile station message according to an embodiment of the invention; and FIGS. 3A, 3B and 3C are flow diagrams showing steps performed while processing a mobile station to TD message according to an embodiment of the invention.

DETAILED DESCRIPTION OF THE INVENTION

Figure 1:
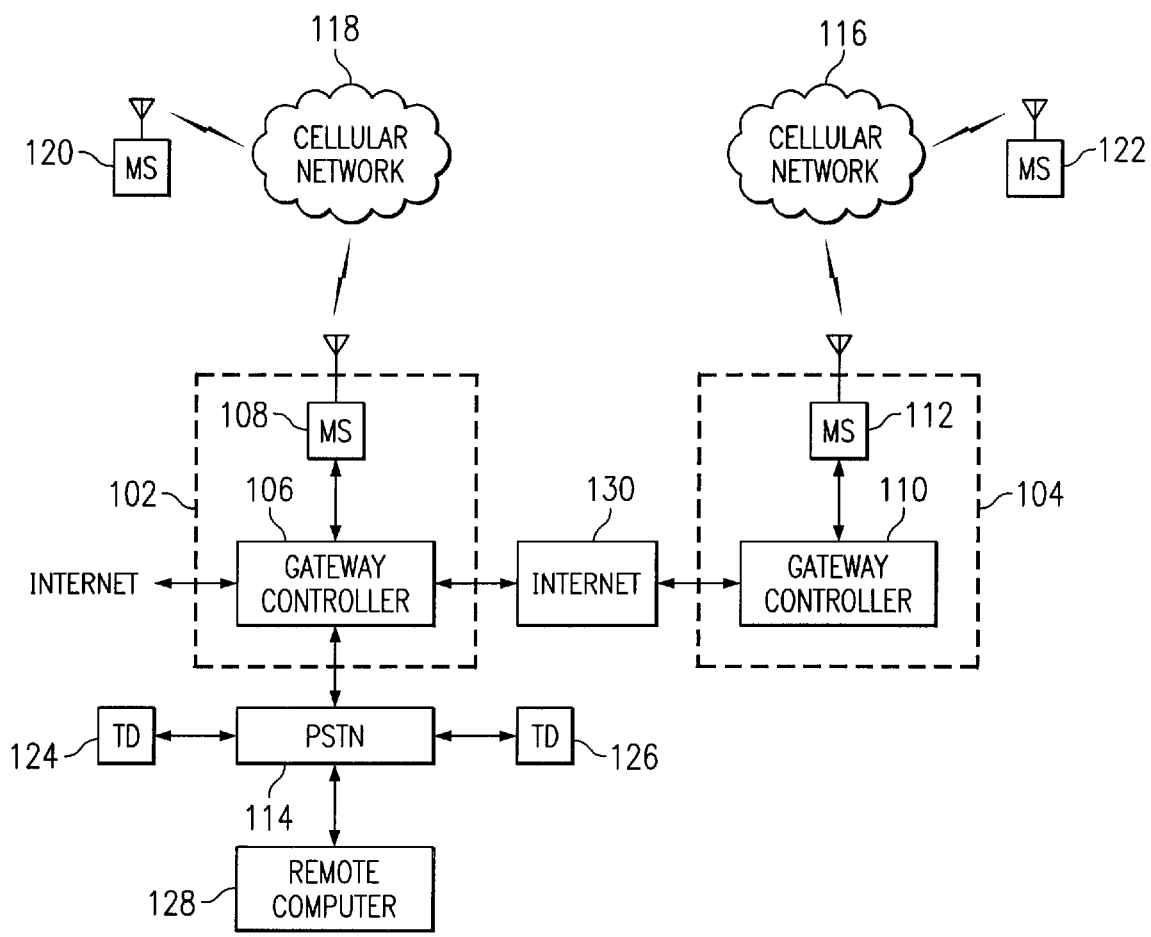
FIG. 1 illustrates a telecommunication system including a TD/SMS gateway according to an embodiment of the invention.

Referring now to FIG. 1, therein is illustrated a telecommunication network including a TD/SMS gateway according to an embodiment of the invention. Network 100 includes a public switched telephone network (PSTN) 114, cellular network 118, cellular network 116, gateway 102, gateway 104, remote computer 128, telecommunication device (TD) 124 and TD 126. In the embodiment, cellular networks 118 and 116 operate according to the Global System for Mobile (GSM) cellular standard. TDs 124 and 126 operate according to the Electronic Industry Association's (EIA) "Telecommunications Devices for the Deaf" PN-1663 Standard (PN-1663).

PSTN 114 may be a conventional public landline phone system. Each of TD 124, TD 126, gateway 102, gateway 104 and remote computer 128 is assigned a phone number of PSTN 114 and is connected to PSTN 114 through appropriate communication interfaces. Gateway 102 comprises gateway controller 106 and mobile station (MS) 108. Gateway 104 comprises gateway controller 110 and mobile station (MS) 112. In the embodiment, MS 108 and MS 112 function as the transceiver in each of gateways 102 and 104, respectively. MS 108 and MS 112 are each assigned a mobile phone number in cellular network 118 and cellular network 116, respectively. Cellular network 118 and cellular network 116 each may comprise at least one cellular network and may also include a portion of a PSTN, such as PSTN 114, as necessary for communicating phone calls between MS 120 and MS 108, and MS 122 and MS 112.

The embodiment of FIG. 1 is designed so that gateway 102 or gateway 104 may be installed without modifying equipment in network 100. MS 108 and MS 112 may be conventional handsets or mobile communicator type devices with SMS text messaging protocol capability, connected to gateway controllers 106 and 110, respectively, through an RS-272 bus, USB bus or other connection, for example, a handset manufacturer-specific bus. In alternative embodiments, MS 108 and MS 112 may be replaced with transceivers built into gateway controllers 106 and 110, respectively. Gateway controllers 106 and 110 are capable of handling text messages according to either SMS text messaging protocol or the PN-1663 text messaging protocol of TDs 124 and 126 and may be implemented in a PC computer or a specially designed hardware/software apparatus. For multiple gateways, such as gateways 102 and 104, Internet 130 may provide communication between the multiple gateways. This may provide an advantage, for example, in communication between MS 122 and TD 124 or 126 when cellular network 116 is remotely located, with no connection to PSTN 114, and Internet connection 130 is by satellite or wireless. It may also avoid expensive phone call charges for communication between MS 122 and TD 124 or TD 126 if it would be necessary for gateway 104 to incur long-distance charges to communicate with PSTN 114 through another PSTN.

Gateway controllers 106 and 110 are configured with appropriate hardware/software to perform the TD/SMS interface function according to the invention. In order to install the embodiment of FIG. 1, an operator procures a PSTN phone number for each of gateway controllers 106 and 110 and a cellular phone number for each of MS 108 and 112. Gateway controllers 106 and 110 are each connected to PSTN 114 by a standard modem for communication with remote computer 128 and a TD modem for communication with TD 124 and TD 126. Gateways 102 and 104 may be implemented independent of, and without modifying, PSTN 114 and cellular networks 116 and 118.

Referring now to FIGS. 2A and 2B, therein are flow diagrams showing steps performed while processing a TD to mobile station message according to an embodiment of the invention. The process steps of FIGS. 2A and 2B are performed by the various components of network 100 of FIG. 1. The functions may be implemented into the components of network 100 using appropriate hardware and/or software. An illustrative example using communication between MS 120 and TD 124 through gateway 102 will be shown.

The process begins at step 200. At step 202, the user of TD 124 dials the PSTN phone number of gateway 102. Next, at step 204, gateway controller 106 answers and sends a prompt message to TD 124. A TD connection, according to TDD protocol, is now set up between gateway controller 106 and TD 124. The prompt message may include a welcome message, for example, "Welcome to the TD/SMS gateway," and a request message, for example, "Please enter the phone number of the destination, then press return." At step 206, the user of the TD responds by entering the number of the mobile station, in this example MS 120, that is to receive the message. The number may be entered in the same manner as numbers are entered when using the PSTN or using a delineation, such as a dash or space character, to enter the number in one of the following formats: 1-xxx-xxx-xxxx, xxx-xxx-xxxx, or xxx-xxxx, where x is a digit from 0 to 9.

Next, at step 208, gateway 102 processes the number. If the entered number was not entered in a valid format, gateway 102 will send out a text message to TD 124, such as, "The phone number xxx-xxx is not a valid number. Please re-enter the number." Steps 206 and 208 may be repeated until the TD user enters a valid phone number in place of the invalid number or hangs up. In alternative embodiments, multiple numbers may be entered as the destination of a message.

At step 210, gateway 102 responds with a prompt message, for example, "Please enter the message text, then press return to send." Next, at step 212, the TD user enters the message text. At step 212, the process moves to FIG. 2B. At step 230 of FIG. 2B, character entry begins. Next, at step 232, gateway controller 106 buffers each character as it is entered. Next, at step 234, it is determined whether or not a text character has been entered. If a text character was entered, the process returns to step 230. At step 232, gateway controller 106 receives and buffers the next input character. If, however, at step 234 it is determined that a text character has not been received, the process moves to step 236. At step 236, it is determined whether or not a backspace character has been received. If a backspace character has been received, the process moves to step 238. At step 238, gateway controller 106 deletes the last entered character. The process then moves to step 232 where gateway controller 106 receives and buffers the next input character. If, however, at step 236 it is determined that a backspace character is not received, the process moves to step 240.

At step 240, it is determined whether or not an esc character has been entered. If an esc character has been entered, the process moves to step 248. At step 248, gateway controller 106 sends a prompt to TD 124. The prompt may read, for example, "Continue with this message? Y/N." Next, at step 250, it is determined if a "Y" character was received in response to the prompt sent in step 248. If a "Y" character was not entered, the process moves to step 252. At step 252, gateway controller 106 dumps the buffer. From step 252 the process returns to step 204 of FIG. 2A. If, however, at step 250 it is determined a "Y" character has been received, the process returns to step 232, where gateway controller 106 receives and buffers the next input character. If, however, at step 240 it is determined that an esc character has been received, the process moves to step 242. At step 242, it is determined that a return character has been received, since in the embodiment all characters other than backspace, esc and return are considered text. At step 244, gateway controller 106 divides the buffer into messages of 160 characters, with additional concatenation characters inserted as necessary. The process then moves to step 214 of FIG. 2A.

At step 214, gateway controller 106 sends the formatted message(s) through the SMS function of MS 108 over cellular network 118 to MS 120. At step 216, gateway controller 106 will send a receipt indication to TD 124, if the SMS function of cellular network 118 sends an SMS delivery receipt to gateway 102.

Referring now to FIGS. 3A and 3B, therein are flow diagrams showing steps performed while processing a mobile station to TD message according to an embodiment of the invention. The process steps of FIGS. 3A and 3B are performed by the various components of network 100 of FIG. 1. The functions may be implemented within the system using appropriate hardware and/or software.

The process begins at step 300. At step 302, the user of MS 120 enters an SMS message at MS 120. The SMS message includes the phone number of the TD device that is to receive the message as a prefix. Next, at step 304, the SMS message is sent through the SMS function of cellular network 118 to MS 108, and the SMS message is transferred to gateway controller 106. Next, at step 306, the message is placed in the TD message queue of gateway controller 106. At step 308, a timer associated with the received message is initialized to run a predetermined period of time and the timer value is placed in the queue. The TD message queue for the received SMS message includes the message text, the phone number of the sending mobile station, MS 108, the time of arrival of the message, and the value of the timer. In alternative embodiments, multiple destination phone numbers could prefix a message and a separate queue entry could be created for each destination TD.

Next, at step 310, it is determined whether or not the prefix of the message includes a valid phone number. If it is determined that there is not a valid phone number in the prefix, the process moves to step 312. At step 312, the message is deleted from the queue. Next, at step 314, gateway 102 sends an SMS message to MS 120 indicating the message was not sent, such as, for example, "The message-[sample text from message]-was not sent due to an invalid number." The process then moves to step 318 and ends. If however, at step 310, it is determined that the prefix of the message includes a valid phone number, the process moves to step 316. At step 316, gateway controller 106 processes the messages in the queue. The queue is processed according to the process steps shown in FIG. 3B.

The process of FIG. 3B begins at step 324. At step 326, gateway controller 106 dials the number of the destination TD of the first (next) message in the queue. In the embodiment, the messages are processed in the order received at gateway 102. Next, at step 328, it is determined whether or not the dialed number is busy. If the number is not busy, the process moves to step 336. At step 336, gateway controller 106 sends the message to the recipient TD using the TDD protocol. Gateway 102 inserts a carriage return and a line feed after every 72 characters to meet TD backward capability specifications. Next, at step 338, gateway 102 sends a return receipt SMS to MS 120, if required by the mobile station user. The process then moves to step 340. If, however, at step 328, it is determined that the dialed number is busy, the process moves to step 330. At step 330, gateway 102 sends an SMS message to MS 120 indicating that the destination TD is not available, such as, for example, "The message-[sample text from message]-was not sent due to a busy signal. The system will retry for one hour." Next, at step 332, it is determined whether or not the timer associated with the message has expired. If the timer has not expired, the message and its associated information are moved to the bottom of the queue. The process then moves to step 340. If, however, at step 332, it is determined that the timer has expired, the process moves to step 350. At step 350, the message is deleted from the queue. The process then moves to step 340.

At step 340, it is determined whether or not every message in the gateway queue has been processed for the latest entrance into the process of FIG. 3B from step 324. If the complete queue has not been processed, the process returns to step 326 and the next message in the queue is processed. If, however, at step 340 it is determined that the complete queue has been processed, the process of FIG. 3B moves to step 342 and ends.

In the embodiment, the queue is processed every time a new SMS-to-TD message is received to be sent to a TD device. The queue may be also periodically processed, for example, every x minutes. Referring now to FIG. 3C, therein is a flow diagram showing process steps performed when the mobile station to TD message queue is periodically processed according to an embodiment of the invention. The process begins at step 344 when a queue processing timer is triggered. At step 346, it is determined whether or not the queue is empty. If it is determined that the queue is empty, the process moves to step 348 and ends. If, however, at step 346 it is determined that the queue is not empty, the process moves to step 352. At step 352, gateway 102 processes the messages in the queue. The queue is processed according to the process steps of FIG. 3B.

Although described in the context of particular embodiments, it will be realized that a number of modifications to these teachings will be apparent to one skilled in the art. Thus, while the invention has been particularly shown and described with respect to preferred embodiments thereof, it will be understood by those skilled in the art that changes in form and scope may be made therein without departing from the scope and spirit of the invention as defined in the appended claims.

What is claimed is:

1. An apparatus for providing text communication between a mobile station operating in a mobile network according to a first text messaging protocol and a telecommunication device (TD) operating in a public switched telephone network (PSTN) according to a second text messaging protocol, said apparatus comprising.

a transceiver having a first interface, said transceiver operable in the mobile network and assigned a mobile phone number therein, said transceiver for receiving a first at least one text message from the mobile station through the mobile network and thereto through entry of the mobile phone number at the mobile station and outputting said first at least one text message on said first interface;

a controller having a second and a third interface, wherein said second interface is coupled to said first interface and said third interface is coupled to the PSTN, said controller assigned a PSTN phone number, and said controller receiving said first at least one text message on said second interface, converting said first at least one text message to said second text message protocol, and sending said first at least one text message through the PSTN to the TD on said third interface.

2. The apparatus of claim 1, wherein said first text messaging protocol comprises a cellular system short message service (SMS) protocol and said second text messaging protocol comprises a telecommunication device for the deaf (TDD) protocol.

3. The apparatus of claim 1, wherein said mobile station comprises a first mobile station and said transceiver comprises a second mobile station.

4. The apparatus of claim 3, wherein said controller comprises a personal computer.

5. The apparatus of claim 1, wherein said controller comprises a personal computer.

6. The apparatus of claim 1, wherein said third interface comprises a modem, having an assigned phone number in the PSTN, compatible with said second messaging protocol, wherein said second at least one message is sent by dialing said assigned phone number at the TD to connect to said third interface.

7. The apparatus of claim 1, wherein said controller further receives a second at least one text message on said third interface, converts said second at least one text message from said second text messaging protocol to said first text messaging protocol, and sends said second at least one text message to said transceiver on said first interface, and wherein said transceiver receives said second at least one text message on said first interface and transmits said second at least one text message to the mobile station.

8. An apparatus for providing text communication between a mobile station operating in a mobile network according to a first text messaging protocol and a telecommunication device (TD) operating in a public switched telephone network (PSTN) according to a second text messaging protocol, said apparatus comprising:

a controller assigned within a PSTN phone number, and said controller having a first and second interface, wherein said first interface is coupled to the PSTN, said controller for receiving a first at least one text message on said first interface, converting said first at least one text message from said second at least one messaging protocol to said first text messaging protocol and outputting said first at least one text message on said second interface; and a transceiver assigned with a mobile phone number, and said transceiver having a third interface, wherein said third interface is coupled to said second interface, said transceiver is operable in the mobile network for receiving a first at least one text message on said third interface and transmitting said second at least one text message to the mobile station through the mobile network.

9. The apparatus of claim 8, wherein said first text messaging protocol comprises a cellular system short message service (SMS) protocol and said second text messaging protocol comprises a telecommunication device for the deaf (TDD) protocol.

10. The apparatus of claim 8, wherein said mobile station comprises a first mobile station and said transceiver comprises a second mobile station.

11. The apparatus of claim 8, wherein said controller comprises a personal computer.

12. A system for providing text communication with a mobile station capable of operating according to a cellular standard and an SMS protocol, said system comprising:

a TD device capable of operating according to a TDD protocol, said TD device coupled to a PSTN;

a standalone SMS/TD gateway comprising:

a transceiver assigned with a mobile phone number defined pursuant to the cellular standard, said transceiver capable of operating according to the cellular standard and SMS protocol; and a controller assigned with a PSTN phone number, said controller coupled to said TD device through the PSTN, said controller for converting between SMS protocol messages and TDD protocol messages to allow text communication between said mobile station and said TD device.

13. The system of claim 12, wherein said SMS/TD gateway comprises a first SMS/TD gateway and said system further comprises a second SMS/TD gateway, said second SMS/TD gateway coupled to said first SMS/TD gateway through an Internet connection.

14. A method for providing text communication between a mobile station operating in a mobile network according to a first text messaging protocol and a telecommunication device (TD) operating according to a second text messaging protocol, said method comprising the steps of:

assigning a mobile phone number to a transceiver;

assigning a first PSTN phone number to a controller;

receiving a first at least one text message from the mobile station through the mobile network at the transceiver, the first at least one text message including a second PSTN phone number assigned to the TD;

transferring said first at least one text message to the controller;

converting said first at least one text message from the first text messaging protocol to the second text messaging protocol; and sending said first at least one text message to the TD through a public switched telephone network (PTSN).

15. The method of claim 14, wherein said method further comprises, after the step of transferring, the steps of:

placing said first at least one text message in a queue at said controller; and starting a timer upon performing said step of placing, said timer being set to run a predetermined period before entry.

16. The method of claim 15, wherein said step of sending comprises the steps of:

determining whether or not said timer is running; and in response to a positive determination:

dialing said second PSTN number assigned to the TD; and sending said first at least one text message to the TD through the PSTN.

17. The method of claim 14, further comprising the steps of:

receiving a second at least one text message from the TD through said PSTN at a controller;

converting said second at least one text message from the first text messaging protocol to the second text messaging protocol;

transferring said second at least one message to said transceiver; and transmitting said first at least one text message to the mobile station through the mobile network.

18. A method for providing text communication between a telecommunication device (TD) operating according to a first text messaging protocol and a mobile station operating in a mobile network according to a second text messaging protocol, said method comprising the steps of:

assigning a PSTN phone number to a controller;

assigning a mobile phone number to a transceiver receiver;

receiving a first at least one text message from the TD through the PSTN at the controller;

converting said at least one text message from the first text messaging protocol to the second text messaging protocol;

transferring said first at least one message to the transceiver; and transmitting said first at least one text message to the mobile station through the mobile network.

19. The method of claim 18, wherein said step of receiving comprises the steps of:

receiving and connecting a phone call through the PSTN from the TD at a controller;

sending a prompt to the TD requesting a destination number;

receiving a destination number at said controller; and receiving a first at least one text message from the TD at said controller.

* * * * *